3,299,004
PROCESS FOR THE MANUFACTURE OF LINEAR POLYESTERS WITH METAL IMIDE SALT CATALYSTS
Adolf Hartmann, Gessertshausen, near Augsburg, and Peter Kresse, Bobingen, near Augsburg, Germany, assignors to Farbwerke Hoechst Aktiengesellschaft vormals Meister Lucius & Bruning, Frankfurt am Main Hochst, Germany, a company of Germany
No Drawing. Filed Apr. 22, 1963, Ser. No. 274,834
Claims priority, application Germany, Apr. 25, 1962, F 36,636
6 Claims. (Cl. 260—75)

The present invention relates to a process for the manufacture of linear polyesters.

It is known that catalysts have to be applied in the manufacture of linear polyesters from bifunctional carboxylic acids or from the esters and bifunctional alcohols thereof so that the reactions proceed rapidly yielding products of high molecular weight which are industrially important. Numerous proposals have already been made relative to the type of catalysts to be applied. In most cases these catalysts were selected metal oxides or the corresponding salts of organic acids. These compounds, however, have the disadvantage that they are insoluble in the melt of the condensate or soluble only in an insufficient degree, which affects their division and activity. It must also be mentioned that various metal oxides are reduced easily and that the metal formed impairs the appearance of the reaction products as well as the products made therefrom, or that many salts, above all the salts of volatile acids, provoke yellowish discolorations of the condensate on account of an undesired reaction with the diols.

Now we have found that linear polyesters are obtained by the catalysis of the ester interchange reaction and/or polycondensation reaction with metal compounds when the metals are used in the form of the salts of acid imides. Suitable imides are, for example, phthalimide, 1,8-naphthalene dicarboxylic acid imide, pyromellitic acid diimide, succinimide, imidazole, benzimidazole, triazole or tetrazole.

All catalytically active metals may be used that form salts with acid imides, for example calcium, magnesium, zinc, cadmium, lanthanum, germanium, tin, lead, titanium, antimony, bismuth, manganese, cobalt.

The new catalysts are obtained in a very simple manner. For example, the chlorides or acetates of said metals can be converted with acid imides or the alkali metal salts thereof in an aqueous or alcoholic solution, or metal hydroxides may be allowed to act upon imdies without the use of solvents.

The amount of imide salts required for the manufacture of polyesters depends essentially on the catalytic activity of the metallic component and amounts to about 0.01 to 0.2 percent of the amount of the dicarboxylic acids or the esters thereof applied. Owing to the molecular-disperse division of the new catalysts, a lower molar proportion generally suffices than is the case with the respective metal oxides. The center of gravity of the catalytic activity may vary in this case.

When departing, as usual, from esters of the dicarboxylic acids with short-chained alcohols, there takes place first an ester interchange reaction with the diols, followed in the second stage by the polycondensation of the bis-diol esters. It is known that different metal compounds can be used as catalysts in these two reaction stages, for example zinc acetate for the ester interchange reaction and antimony trioxide for the polycondensation. Also in the case of the imide salts differences are observed as regards the catalytic action in the two different reaction stages. For example, in the reaction mentioned first special imide salts of zinc and lead were found to be suitable, while in the following reaction the imide salts of zinc, tin and titanium proved to be useful. When in each reaction stage one representative each of the imide salts effective in each particular case is applied, different anionic constituents need not be introduced in contrast to the prior art processes. It may also be possible to catalyze both the ester interchange reaction and the polycondensation by means of a sole compound; this applies, for example, to phthalimide zinc. A catalyst of this type is of special advantage when carrying out the process on an industrial scale.

By choosing the suitable metallic components it is, moreover, easily possible to limit the polymerization degree of the condensates in a definable manner without having to interrupt the reaction prematurely. This may be of importance for the adjustment of certain properties of finished goods, such as diminishing the tendency of woven or knitted goods towards pilling. Catalysts of this type are, for example, the phthalimide or succinimide salts of cadmium or cobalt.

For the process according to the invention there may be used all acids and diols which are suitable for the preparation of linear polyesters of high molecular weight, especially dicarboxylic acids whose carboxylic acid groups are bound to aromatic nuclei, and aliphatic or cycloaliphatic diols having 2 to 8 carbon atoms. Of the great number of suitable compounds there are mentioned adipic acid, sebacic acid, trans-1.2-cyclobutane dicarboxylic acid, terephthalic acid, 1.4-naphthalene dicarboxylic acid, 4.4'-diphenyl dicarboxylic acid, 4.4'-sulfonyl dibenzoic acid, 2.5-thiophene dicarboxylic acid; furthermore ethylene glycol and its homologues, diethyl glycol, 2.2-dimethyl propane-diol, 1.4-dimethylol cyclohexane. There are also suitable $\omega$-hydroxy-carboxylic acids which yield self-condensation products of high molecular weight, such as para-($\beta$-hydroxy-ethoxy)-benzoic acid or 1-(2-hydroxyethyl)-4-benzene carboxylic acid. Of the dicarboxylic acids, the dimethyl esters are generally used for carrying out the syntheses, however, there may also be used other ester groups. For the process according to the invention there are preferably used dimethyl terephthalate and ethylene glycol. It is also possible jointly to polycondense several dicarboxylic acids or dicarboxylic acid esters and several diols in order to obtain copolyesters in this manner.

The process is carried out in known manner. In order to carry out the ester interchange reaction, the mixture comprising, for example, a dimethyl ester and an excess amount of diol is heated for a prolonged time at 180° to 200° C. until the methanol is split off; subsequently the excess amount of diol is distilled off. The bis-diol esters formed in this manner can, however, also be obtained in another manner while avoiding the ester interchange reaction, for example from the dicarboxylic acids and epoxides. Thus bis-glycol terephthalate can be obtained directly from terephthalic acid and ethylene oxide.

The polycondensation is generally carried out in several stages by exposing the reaction mass which is kept under reduced pressure, generally below 1 mm. Hg, to temperatures rising progressively within the range of from 200° to 300° C., while agitating the reaction mass slowly and uniformly. When the condensation, whose progress can be observed by the energy which is necessary for stirring the mass, has been terminated, the melt is discharged into water, comminuted and dried.

There are obtained condensates of high molecular weight which can be shaped easily, which have a light appearance and a high melting point. They can easily be processed into shaped structures, such as filaments, fibers or sheets which possess good physical properties after having been subjected to the usual drawing process.

The following examples serve to illustrate the invention, but they are not intended to limit it thereto, the parts being by weight:

*Example 1*

0.09 grams of zinc-phthalimide was added to a mixture comprising 450 grams of dimethyl terephthalate and 432 grams of ethylene glycol and the mixture was heated in an atmosphere of nitrogen at 185° C. The reesterification was terminated after 4 hours and the total theoretical amount of methanol was split off. The temperature was slowly raised to 275° C., with agitation, while the pressure was reduced to 0.2 mm. Hg, whereby the excess amount of the ethylene glycol applied distilled off. After the reaction mass had been maintained under the aforementioned pressure at a temperature of 275° to 280° C. for 3 hours, it was discharged into cold water. A clear polycondensate having a melting point of 260° C. was obtained which could easily be spun into drawable filaments of high tensile strength.

*Example 2*

0.5 kilogram of dimethyl terephthalate and 0.48 kilogram of ethylene glycol were reesterified with 0.10 grams of zinc acetate, as described in Example 1, and polycondensed in the presence of 0.08 gram of tin-phthalimide. After a total of 6 hours, a light polyester was obtained whose relative viscosity was 1.725 (measured in a solution of 1% strength by weight in chlorophenol at 20° C.). The product could easily be spun into drawable filaments of high tensile strength.

When the condensation period was prolonged by one hour, the relative viscosity of the polyester was 2,110 without the product having undergone a change in appearance.

Instead of zinc acetate there may also be used 0.12 gram of lead phthalimide.

*Example 3*

0.005 part of cadmium phthalimide was added to 30 parts of bis-(β-hydroxy-ethyl)-terephthalate and heated in an atmosphere of nitrogen at 200° C., with agitation. In the course of 1.5 hours, the temperature was raised to 280° C., the pressure was reduced to 0.2 mm. Hg and the reaction mixture maintained under these conditions for 2½ hours, whereby the ethylene glycol set free by the polycondensation distilled off. After the reaction mass had been discharged into water, a light polycondensate was obtained that had a melting point of 260° C. and a relative viscosity of 1.570 (measured in a solution of 1% strength by weight in chlorophenol at 20° C.). The product could easily be spun into drawable filaments.

*Example 4*

40 parts of bis-(β-hydroxy-ethyl)-terephthalate were polycondensed as described in Example 3; however, instead of cadmium phthalimide there was used 0.04 part of cobalt succinimide as a catalyst. A colorless polyester was obtained that had a melting point of 261° C. and a relative viscosity of 1.585 (measured in a solution of 1% strength by weight in chlorophenol at 20° C.).

We claim:

1. A process for the manufacture of linear, fiber-forming polyesters by reesterification of an ester of a dicarboxylic acid selected from the group consisting of adipic acid, sebacic acid, trans-1,2-cyclobutane dicarboxylic acid, terephthalic acid, 1,4-naphthalene dicarboxylic acid, 4,4'-diphenyldicarboxylic acid, 4,4'-sulfonyl dibenzoic acid, and 2,5-thiophene dicarboxylic acid and methanol with a bi-functional organic hydroxy compound having 2 to 8 carbon atoms at a temperature within the range of from 180° to 200° C. and subsequent polycondensation of the dihydroxy ester obtained under reduced pressure at a temperature within the range of from 200° to 300° C., which comprises catalying the reesterification and the polycondensation by adding 0.01 to 0.2 percent by weight, calculated on the dicarboxylic acid ester, of an acid imide selected from the group consisting of phthalimide, 1,8-naphthalene dicarboxylic acid imide, pyromellitic acid diimide, succinimide, imidazole, benzimidazole, triazole, and tetrazole of a metal selected from the group consisting of calcium, magnesium, zinc, cadmium, lanthanum, germanium, tin, lead, titanium, antimony, bismuth, manganese and cobalt.

2. A process for the manufacture of linear, fiber-forming polyesters by reesterification of an ester of a dicarboxylic acid selected from the group consisting of adipic acid, sebacic acid, trans-1,2-cyclobutane dicarboxylic acid, terephthalic acid, 1,4-naphthalene dicarboxylic acid, 4,4'-diphenyldicarboxylic acid, 4,4'-sulfonyl dibenzoic acid, and 2,5-thiophene dicarboxylic acid and methanol with a bi-functional organic hydroxy compound having 2 to 8 carbon atoms at a temperature within the range of from 180° to 200° C. and subsequent polycondensation of the dihydroxy ester obtained under reduced pressure at a temperature within the range of from 200° to 300° C., which comprises catalyzing the reesterification by the addition of 0.001 to 0.2 percent by weight, calculated on the dicarboxylic acid ester, of an acid imide selected from the group consisting of phthalimide, 1,8-naphthalene dicarboxylic acid imide, pyromellitic acid diimide, succinimide, imidazole, benzimidazole, triazole, and tetrazole of a metal selected from the group consisting of calcium, magnesium, zinc, cadmium, lanthanum, germanium, tin, lead, titanium, antimony, bismuth, manganese and cobalt.

3. A process for the manufacture of linear, fiber-forming polyesters by reesterification of an ester of a dicarboxylic acid selected from the group consisting of adipic acid, sebacic acid, trans-1,2-cyclobutane dicarboxylic acid, terephthalic acid, 1,4-naphthalene dicarboxylic acid, 4,4'-diphenyldicarboxylic acid, 4,4'-sulfonyl dibenzoic acid, and 2,5-thiophene dicarboxylic acid and methanol with a bi-functional organic hydroxy compound having 2 to 8 carbon atoms at a temperature within the range of from 180° to 200° C. and subsequent polycondensation of the dihydroxy ester obtained under reduced pressure at a temperature within the range of from 200° to 300° C., which comprises catalyzing the polycondensation by the addition of 0.01 to 0.2 percent by weight, calculated on the dicarboxylic acid ester, of an acid imide selected from the group consisting of phthalimide, 1,8-naphthalene dicarboxylic acid imide, pyromellitic acid diimide, succinimide, imidazole, benzimidazole, triazole, and tetrazole of a metal selected from the group consisting of calcium, magnesium, zinc, cadmium, lanthanum, germanium, tin, lead, titanium, antimony, bismuth, manganese and cobalt.

4. A process for the manufacture of linear polyethylene terephthalate by reesterification of dimethyl terephthalate with ethylene glycol at a temperature within the range of from 180° to 200° C. and subsequent polycondensation of the bis-(hydroxy-ethyl)-terephthalate obtained under reduced pressure and at a temperature within the range of from 200° to 300° C., which comprises catalyzing the reesterification and polycondensation by the addition of 0.01 to 0.2 percent by weight, calculated on the dimethyl terephthalate, of an imide of a metal selected from the group consisting of calcium, magnesium, zinc, cadmium, lanthanum, germanium, tin, lead, titanium, antimony, bismuth, manganese and cobalt.

5. A process for the manufacture of linear polyethylene terephthalate by reesterification of dimethyl terephthalate with ethylene glycol at a temperature within the range of from 180° to 200° C. and subsequent polycondensation of the bis-(hydroxy-ethyl)-terephthalate obtained under reduced pressure and at a temperature within the range of from 200° to 300° C., which comprises catalyzing the reesterification by the addition of 0.01 to 0.2 percent by weight, calculated on the dimethyl terephthalate, of an imide of a metal selected from the group consisting of calcium, magnesium, zinc, cadmium, lanthanum, germanium, tin, lead, titanium, antimony, bismuth, manganese and cobalt.

6. A process for the manufacture of linear polyethylene terephthalate by reesterification of dimethyl terephthalate with ethylene glycol at a temperature within the range of from 180° to 200° C. and subsequent polycondensation of the bis-(hydroxy-ethyl)-terephthalate obtained under reduced pressure and at a temperature within the range of from 200° to 300° C., which comprises catalyzing the polycondensation by the addition of 0.01 to 0.2 percent by weight, calculated on the bis-(hydroxyethyl)-terephthalate, of an imide of a metal selected from the group consisting of calcium, magnesium, zinc, cadmium, lanthanum, germanium, tin, lead, titanium, antimony, bismuth, manganese and cobalt.

References Cited by the Examiner
FOREIGN PATENTS
922,937   4/1963   Great Britain.

WILLIAM H. SHORT, *Primary Examiner.*

R. T. LYON, *Assistant Examiner.*

Notice of Adverse Decision in Interference

In Interference No. 96,402 involving Patent No. 3,299,004, A. Hartmann and P. Kresse, Process for the manufacture of linear polyesters with metal imide salt catalysts, final judgment adverse to the patentees was rendered Nov. 21, 1968, as to claims 1, 2 and 3.

[*Official Gazette March 11, 1969.*]